Figure 2:
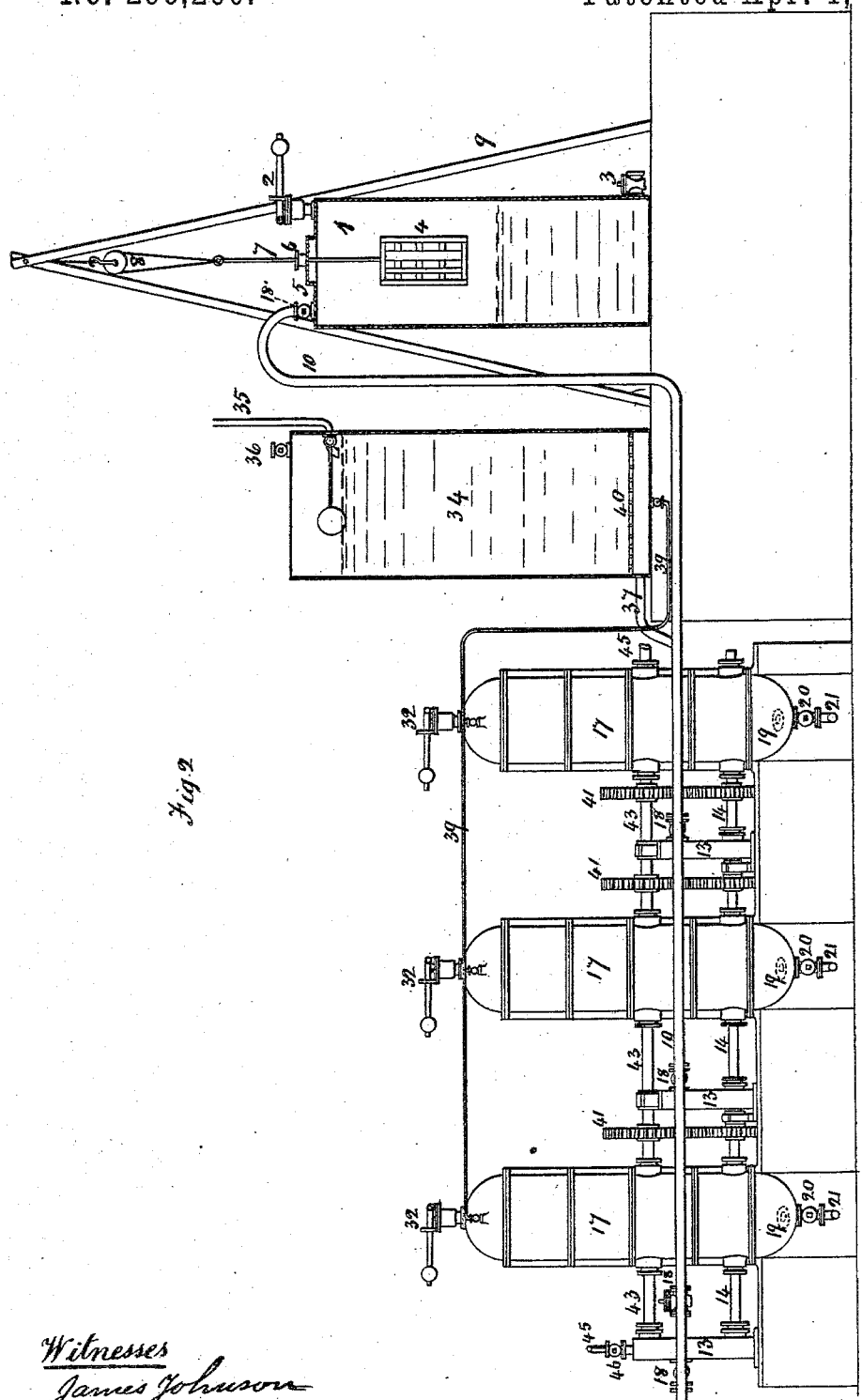

(No Model.) 3 Sheets—Sheet 1.
C. WIGG.
APPARATUS FOR THE MANUFACTURE OF BICARBONATE OF SODA.
No. 296,260. Patented Apr. 1, 1884.
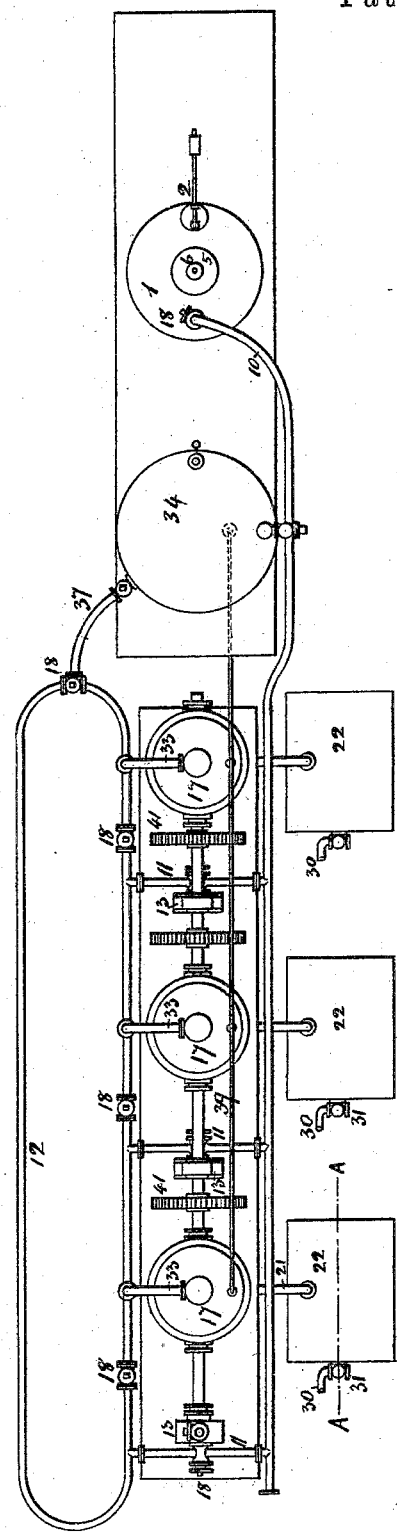
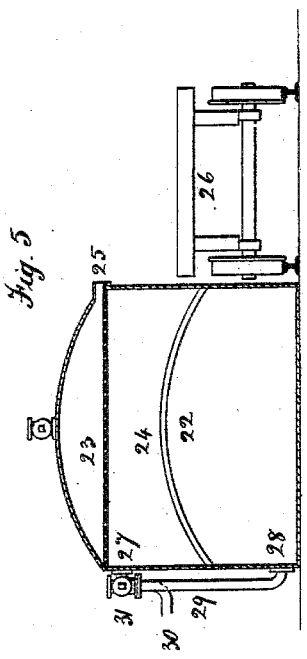
Witnesses
Inventor (No Model.) 3 Sheets—Sheet 2.

C. WIGG.
APPARATUS FOR THE MANUFACTURE OF BICARBONATE OF SODA.
No. 296,260. Patented Apr. 1, 1884.

Witnesses
James Johnson

Inventor
Charles Wigg

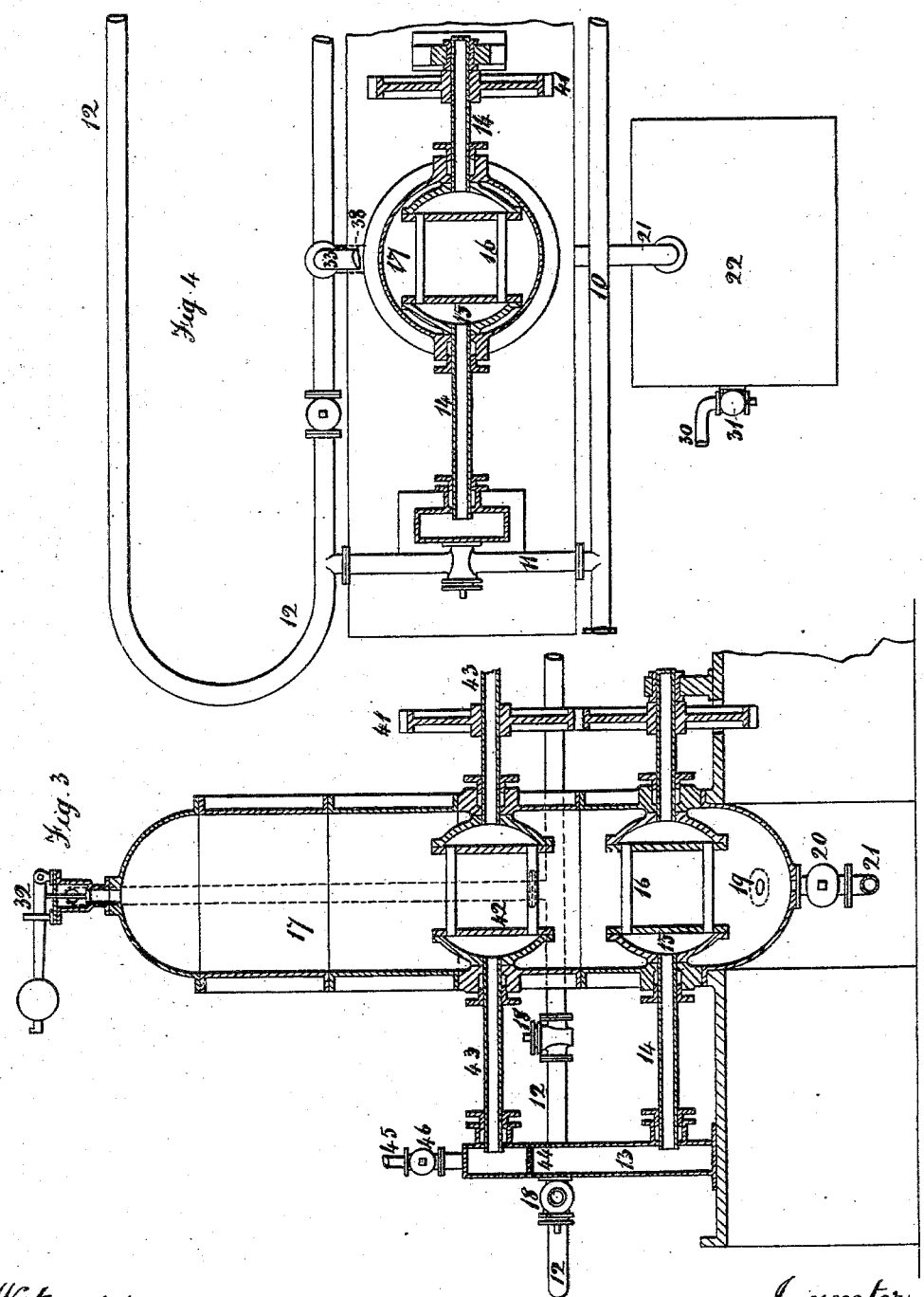

UNITED STATES PATENT OFFICE.

CHARLES WIGG, OF LIVERPOOL, COUNTY OF LANCASTER, ENGLAND.

APPARATUS FOR THE MANUFACTURE OF BICARBONATE OF SODA.

SPECIFICATION forming part of Letters Patent No. 296,260, dated April 1, 1884.

Application filed September 18, 1883. (No model.) Patented in England July 3, 1882, No. 3,125.

*To all whom it may concern:*

Be it known that I, CHARLES WIGG, a subject of the Queen of Great Britain, residing at Liverpool, in the county of Lancaster, England, have invented a new and useful Improvement in Plants for the Manufacture of Bicarbonate of Soda, (for which I have obtained a patent in Great Britain, No. 3,125, bearing date July 3, 1882, and nowhere else,) of which the following is a specification.

My invention relates to a plant or apparatus used in the manufacture of bicarbonate of soda or potassa from common salt or chloride of sodium by the reaction of free ammonia and carbonic acid upon brine. The main objects are to provide a plant or apparatus in which the process of manufacture may be continuously carried on with as little escape or loss of ammonia and carbonic acid as possible, and in which the various operations of generating the carbonic acid, maintaining the liquors during reaction at the required temperatures, obtaining intimate admixture of the brine and gaseous reagents, and filtering the finished product may be advantageously effected.

The accompanying three sheets of drawings show what I consider as the most effective construction and disposition of my improved plant or apparatus.

Figure 1 is a plan, and Fig. 2 a side elevation, of complete plant under my invention. Fig. 3 is a vertical, and Fig. 4 a horizontal, section of one of the absorbers; and Fig. 5 is a vertical section of one of the filters at the line A A.

In all these views like figures of reference denote the same parts.

1 is a wrought-iron chamber or vessel, in which the carbonic acid is generated; 2, safety-valve to prevent undue pressure; 3, draw-off tap; 4, cage for containing carbonate of barium; 5, door or lid through which the cage is filled; 6, stuffing-box; 7, suspending-rod; 8, pulley and gear for raising and lowering the cage; 9, standards; 10, pipe leading from the generator 1 to the cross-pipes 11, which are connected to the circulating-pipe 12, and to the lower part of the hollow standards 13; 14, hollow axles, connected to the standards 13 by stuffing-boxes, and to the hollow disks 15 and perforated distributers 16 within the absorbers 17; 18, shut-off cocks; 19, brine-inlet cocks to absorbers; 20, draw-off cocks connected by pipes 21 to the filter-chambers 22; 23, filter-beds carried on cross-bars 24; 25, door through which filter-beds are removed and replaced; 26, truck for removing filter-beds. The filter-beds are made of metal plates covered with cloth or a suitable filtering medium. 27 28, outlet-ways connected by the pipe 29; 30, pipe leading to exhaust-pump; 31, cock for opening the ways 27 28 to the exhaust-pump; 32, safety-valves on tops of absorbers; 33, pipes leading from tops of absorbers to circulating-pipe 12; 34, purifying-chamber for brine; 35, brine-inlet; 36, exhaust way and cock; 37, cock and pipe connecting the purifying-chamber with the circulating-pipe 12; 38, pipes connecting the circulating-pipe to the brine-inlet, ways, and cocks 19, leading to the absorbers, and situated beneath the pipes 33; 39, waste-gas pipes and cocks connecting the absorbers to the purifying-chamber 34 beneath the perforated plate 40; 41, gearing for imparting motion to the perforated beaters 16, and to the hollow unperforated beaters 42. The beaters 42 communicate by the hollow axles 43 with the upper part of the hollow standards 13, divided from the lower part by a partition, 44, and with a water-circulation pipe, 45; 46, cock for regulating the flow of the water through the hollow beaters 42.

The plant or apparatus is employed in the manufacture of bicarbonate of soda, as follows: Brine obtained or prepared in any usual or desired way is run into the purifying-chamber 34 through the inlet-way and ball-cock 35, and the waste gases from the absorbers enter the chamber 34, beneath the plate 40, through the pipe 39, flow up through the brine and escape through the cock 36. The waste gases, in passing through the brine, precipitate any lime and magnesia which may be dissolved in the brine. The brine so purified is caused to enter the absorbers 17 through the pipes 37 38. When the absorbers are filled to the required height, ammonia and carbonic-acid gases are admitted, together or separately, into the absorbers among the brine through the pipes 10 11 and perforated distributers 16. In this manner the brine is agitated, and the gases are admitted therein in thin streams, so as to come into intimate contact with every part and insure active chemical action. To render the distribution of the gas more uniform and effective, the distributers are caused to rotate by means of the gearing 41. The carbonic acid is generated in the chamber or vessel 1 by dipping the cage 4, containing carbonate of barium, into hydrochloric acid, with which the said chamber or vessel 1 has been partly filled, or carbonic acid may be obtained in any convenient manner. The ammonia is obtained in any usual or suitable way, and is led by a pipe to the pipe 10, above mentioned, the connection being made by a flange or other suitable joint. The ammonia and carbonic-acid gases are passed up through the brine in an absorber, then down one of the pipes 33 to the circulating-pipe 12; afterward into a second absorber through a cross-pipe, 11, and finally through the waste-pipe 39 to the chamber 1, as before mentioned. As the salt in any absorber becomes converted into bicarbonate the ammonia and carbonic-acid gas are shut off by the cocks 18, and the converted liquor is run into the filters through the cocks 20 and pipes 21. The bicarbonate is retained on the filter-bed, and the waste liquor flows into the bottom of the filter-chamber, the way 27 being open to the exhaust-pump to maintain a partial vacuum in the chamber 22, beneath the filter-bed 23, so as to facilitate filtration. When filtration has been completed, the way 28 is opened to the exhaust, and the waste liquor flows away therethrough, to be treated for the recovery of carbonic acid and ammonia or in any other way. The precipitated bicarbonate of soda is roasted to expel carbonic acid, which may be again used in the manufacture of bicarbonate, or is treated in any other desired manner. The absorbers are used in series—that is to say, when three are used, two are in operation while one is being filled with brine or is being emptied of the treated liquors.

It will be evident that more than three absorbers may be used in series. While the brine and gases are reacting on one another it is necessary that the temperature of the brine undergoing conversion should be maintained at a nearly uniform temperature, and this is effected by regulating the flow of cold water through the rotating beaters 42. Otherwise the reaction would cause a great increase of temperature, which would be greatly detrimental.

I claim—

1. In a plant or apparatus for the manufacture of bicarbonate of soda, the combination, with the absorber, of a carbonic-acid-generating chamber connected therewith by suitable pipes, and provided with a vertically-adjustable cage for the material from which the gas is generated, substantially as and for the purposes specified.

2. In a plant or apparatus for the manufacture of bicarbonate of soda, the combination, with the absorbers, of a brine-purifying chamber connected therewith by a brine-delivery and a gas-inlet pipe, said purifying-chamber having a perforated plate or diaphragm arranged over the gas-inlet pipe, substantially as and for the purposes specified.

3. The combination, with an absorber for the manufacture of bicarbonate of soda, of a transversely-arranged hollow perforated rotating agitator and gas-distributer, substantially as and for the purposes specified.

4. In plant or apparatus for the manufacture of bicarbonate of soda, the combination of absorbers 17 with hollow beaters 42, adapted for the circulation of water, for the purpose and substantially in the manner set forth.

5. The combination of absorbers 17 with hollow distributers 16 and beaters 42, for the purposes set forth.

6. In a plant or apparatus for the manufacture of bicarbonate of soda, the filter-chambers 22, inlet-way 21, filter-bed 23, door 25, outlet-ways 27 and 28, pipe 29, and cock 31.

7. In a plant or apparatus for the manufacture of bicarbonate of soda, the combination of a series of absorbers, each provided with rotating perforated gas-distributers and rotating cooling-beaters, said absorbers connected by circulating-pipes, a brine-purifying tank provided with a perforated diaphragm and connected with the absorbers by a brine-delivery pipe and a gas-inlet pipe, a carbonic-acid-gas generator provided with a vertically-adjustable cage and connected with the absorbers by suitable gas-delivery pipes, and a series of filters, each connected with its respective absorber, and with an exhaust-pump for maintaining a partial vacuum in the filters, substantially as and for the purposes specified.

8. In a plant for the manufacture of bicarbonate of soda, the combination of an absorber having hollow perforated rotating gas-distributers, a brine-purifier having a perforated diaphragm, the absorber and purifier being connected by a brine-pipe and a gas-pipe, and a carbonic-acid generator of the character herein described, said generator being connected with the rotating perforated beaters and distributers of the absorber, substantially as and for the purposes specified.

CHARLES WIGG.

Witnesses:
JAMES JOHNSON,
W. B. JOHNSON.